Dec. 8, 1959  P. GRAHAM  2,916,167
VEHICLE PARKING DEVICE
Filed Nov. 22, 1957
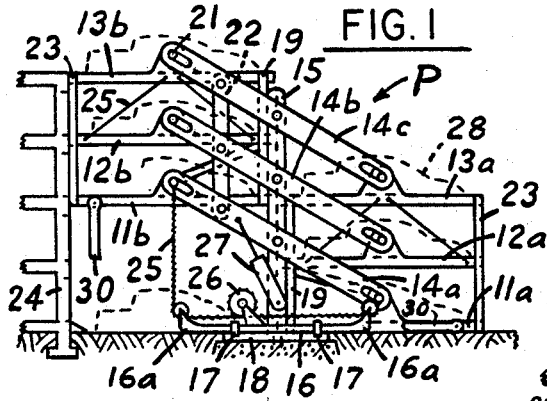
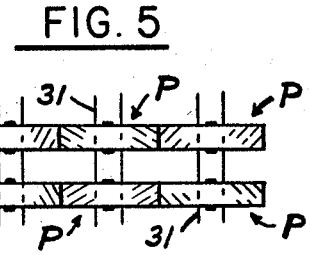
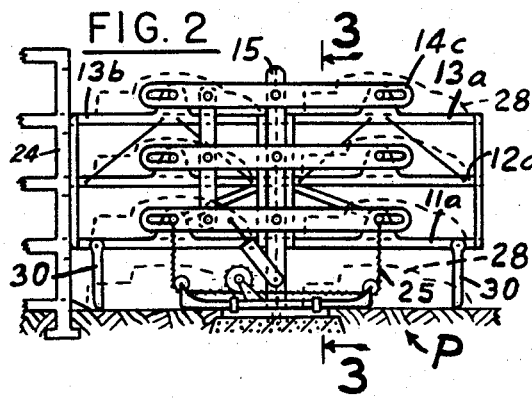
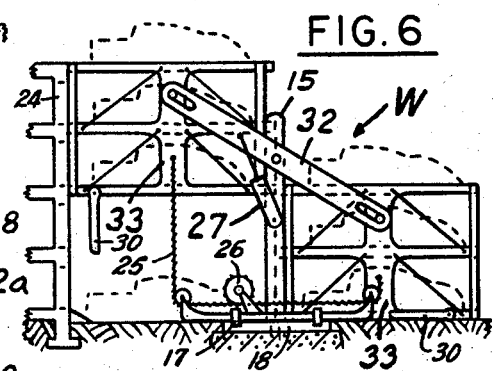
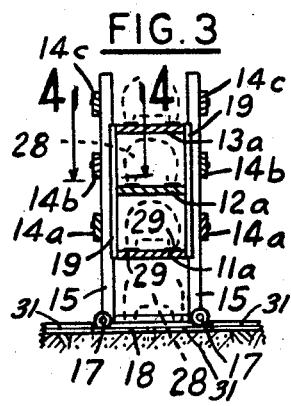
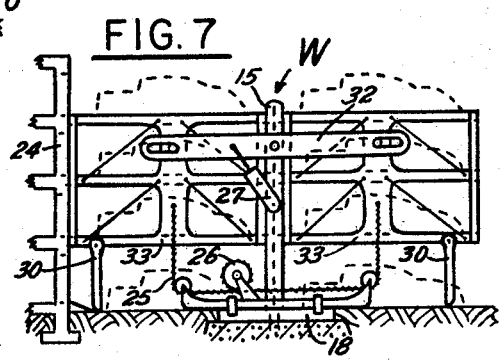
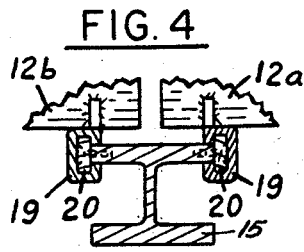
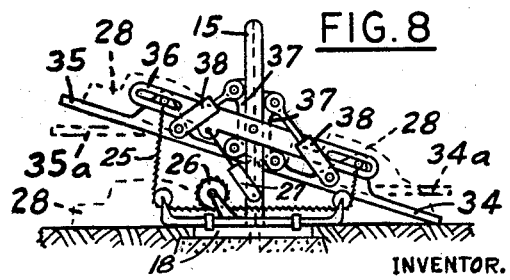
INVENTOR.
Phillip Graham
BY
William J. Ruano
ATTORNEY

United States Patent Office 2,916,167
Patented Dec. 8, 1959

2,916,167

VEHICLE PARKING DEVICE

Phillip Graham, Pittsburgh, Pa.

Application November 22, 1957, Serial No. 698,284

1 Claim. (Cl. 214—16.1)

My invention relates to a vehicle parking device which can be readily used to raise and park vehicles above the ground level. The device is useful to raise and store, stow, or display automobiles in tiers in what would otherwise be space unused for economical parking. This invention is a continuation-in-part of my co-pending application, Serial No. 471,810, filed Nov. 29, 1954, entitled Vehicle Parking Device, now Patent No. 2,815,872.

My vehicle parking device can be set up temporarily or permanently on available fixed surfaces, such as parking lots, roof surfaces, and the like, also on movable surfaces, such as railroad flat cars, barges, and the like. The device can be quickly erected and dismantled without materially disturbing the surfaces. The device may be used to raise or lower vehicles through a range of floor levels and the like.

The vehicle parking device, embodying the principles of this invention, has balanced tilting beams or rockers. The ends of the rockers support level platforms on which vehicles are parked and with which the vehicles are raised. The balancing features allow a low powered motor to tilt the device when it is fully loaded. The parking device is safer, simpler, less costly, and less time consuming to operate than the parking device described in my co-pending application.

An object of my invention is to provide a safe, low cost vehicle parking device that has balanced, see-saw-like horizontal parking platforms which can be raised and lowered to park a large number of vehicles in a space above a small area.

Other objects and advantages of my invention will become apparent from a study of the following specification taken with the accompanying drawings wherein:

Fig. 1 is a schematic, elevational view showing a three tier parking device embodying the principles of my invention;

Fig. 2 is a view similar to Fig. 1 showing the parking device with its rockers in a non-tilted position;

Fig. 3 is a sectional view taken along line 3—3 of Fig. 2;

Fig. 4 is a sectional view taken along line 4—4 of Fig. 3;

Fig. 5 is a plan view showing a parking lot arrangement with two rows of movable parking devices with an access aisle between them;

Fig. 6 is a schematic elevational view similar to Fig. 1, showing a modified parking device;

Fig. 7 is a view similar to Fig. 6 showing the modified parking device with its rocker in a non-tilted position;

Fig. 8 is a schematic elevational view showing a single tier parking device that has platforms that can be tilted.

Referring to the drawing, Figs. 1, 2, 3, and 4 show a three tier vehicle parking device P that has three pairs of platforms on which six automobiles, or the like, may be parked. Two autos may be parked below the bottom platforms. The platforms are raised and lowered to allow autos to be parked or raised above the ground level.

The platforms reciprocate in a manner to provide mutual assistance in loading the second and third tiers.

The parking device P is similar to the parking devices described in my co-pending application Serial No. 471,810. The improvements shown and described in this application describe safer and less costly parking devices that are more simple in construction.

The parking device is balanced when it is empty, also when it is loaded with vehicles of equal weight evenly distributed at each end. The parking device is loaded so that it is never out of balance by more than the weight of one auto.

The parking platforms 11a, 11b, 12a, 12b, 13a, and 13b are supported by pairs of rockers 14a, 14b, and 14c. The rockers are pivotally supported by a pair of wide flange structural steel columns 15. The columns 15 are supported by a base. The base is of a type that would suit the conditions for the intended use and site.

The horizontal base member 16 may be fastened with anchor bolts to a concrete foundation, or the base 16 may have wheels 17 attached to it to allow the parking device P to be moved laterally. Powered means, such as an electric motor driven means, may be used to move the parking device. The wheels 17 may engage rails to allow it to be moved easily. The base 16 has hook-like offsets similar to 8c in Fig. 16 of my prior Patent No. 2,695,716 and in Fig. 9 of my prior Patent No. 2,815,872 to engage the undersides of the railheads to restrain the parking device from overturning. Fig. 5 shows parking devices P and railed tracks on which the devices may be moved laterally. The rails and their relationship with the parking device may be similar to the arrangement shown in Figs. 14, 15, and 16 of my prior Patent No. 2,695,716.

The base of the parking device may engage a turntable 18 to allow the parking device to be rotated. The turntable may be similar to turntable 49a shown in Figs. 14 and 15 of my prior Patent No. 2,695,716. Rockers 14a, 14b, and 14c are pin-connected to the columns 15. The rockers are also pin connected to the platforms. As shown in Fig. 4, the retainers 19 slidably engage the bars 20 and the column 15. The bars 20 are attached to a column 15 with bolts or welds. The retainers 19 are rigidly attached to the platforms, each retainer linking a stack of platforms together. The retainers 19 allow the platforms to move in a vertical direction and prevents them from moving laterally away from the columns 15. Slots in the ends of the rockers allow the rockers to maintain engagement with the pins 21. The vertical link 22 may be pivotally engaged to the rockers to link them together so they remain parallel to each other. The link 22 provides a direct strong means to fasten the rockers together. The link 22 may be omitted when the platforms, retainers 19 and links 23 are made strong enough to prevent excessive play between the rockers. Links 23 may be used to tie the outer ends of the platforms together. The links 23 may be made similar to retainers 19 to engage bars like bars 20 that are mounted on the side of the building 24. This arrangement braces the parking device against the building. Pairs of diagonal rods 25 engage the top platforms and the middle platforms, thus bracing the platforms. The retainers 19 and the platforms to which they are rigidly attached, form a stiff frame that works along with the columns 15 to brace the parking device to prevent it from swaying. The rods 25 may support the middle platforms 12a and 12b, omitting the rockers 14b. The middle and bottom platforms may be supported by the top platforms, with the retainers 19 and the links 23 being the supporting ties. This supporting arrangement omits the rockers 14a, 14b, and links 22.

The parking device may be tilted with a cable and winch drum arrangement as shown. The ends of the cable 25 are attached to the pins at the ends of the rocker 14a. The cable 25 is wrapped several turns around the drum 26. Outriggers 16a, on the base member 16, support pulleys on which the cable is rigged. The drum 26 is geared so that it may be turned by a small motor or by a hand crank. The drum mechanism is reversible to allow the parking device to be tilted in either direction. A power driven hydraulic cylinder may be used to tilt the device instead of the cable and drum arrangement.

A non-powered bleeder type hydraulic cylinder 27 may be used as a safety means to act to stop the tilting action if the cable 25 or the drum 26 fails. The cylinder 27 has a valve that closes in response to tripping means. The tripping action can be done automatically when a safety screen under a platform is pressured by an obstruction below it. Such a safety screen with a tripping action may be similar to those shown and described in my prior Patent No. 2,695,716.

The automobiles 28 may be moved along the platforms and be shifted from any platform on one end of the device to any platform on the other end of the device, as the device can be selectively tilted so that any two opposing platforms can be aligned to the same elevation. Each platform may have a powered conveyor 29 of any well-known construction to move an auto. The conveyor may have means to clutch the wheels of an auto, thus allowing an auto to be driven from an access lane onto the end of a platform that is positioned like platform 11a, as shown in Fig. 1, until the front auto wheels engage the conveyor 29. Then the driver may leave the auto, after which the conveyor 29 is activated to pull the auto onto the platform. The conveyor 29 can push the auto off a platform by reverse actions. Therefore, no person needs to be on the platforms to park the autos, which allows safer and faster parking of autos with less effort.

Limit switches of any well-known construction and automatic wheel blocks such as S in Fig. 19 of my prior Patent No. 2,815,872 prevent the auto from moving off an open end of a platform that is not aligned to another platform or access means. The parking device may be used to raise autos to the various elevated floors of the building 24. The openings in the buildings may have automatic wheel blocking means. A control panel (not shown) near the ground level may house the controls for tilting the parking device with the drum 26 and for activating the conveyors 29. Thus people are never in the autos that are wholely parked on the platforms. The operator who drives an auto so the front end engages the conveyor or the platform, does not reach a position where the platform above would fall in case of a failure of the safety devices. If autos are to be driven to positions under the lower platforms, as shown in Fig. 2, hinged posts 30 with serrated ends to provide one-way engagement with the ground surface may be used as extra safety means to prevent a platform from being lowered onto an auto with an occupant. The posts 30 would be swung aside when they are not needed. The building 24 may have safety catches attached to it to prevent tilting of the parking device when a car is being parked below it. The catches may have solenoids that are responsive to electric controls on the control panel on the parking device. Catches fixed to column and buildings are used to engage latches on ends of platforms. Further details of said safety devices are shown in my prior Patent Nos. 2,815,872 and 2,695,716.

The parking devices P may be arranged on a parking lot as shown in Fig. 5, which allows the devices to be moved laterally along tracks 31. The access aisle between the two rows of devices P allows a device P to be shifted to the aisle for loading and unloading. When a device P is in the aisle, autos may be driven to parking positions on the ground level where the device P has been retracted. The rockers on the device P are positioned horizontally when the device is moved back into its normal position. The devices P are positioned so the outriggers 16a are on the side adjacent to the access aisle. This positioning allows the narrow base structure on the other side to clear the autos parked on the ground level. The three tiered parking device P allows an auto to be moved onto a lowered platform 11a, then to be raised by tilting the rockers fully to the opposite positioning, bringing the platforms 11a and 13b into alignment so the auto can be shifted to the platform 13b. The rockers can be tilted less to bring the platform 12b into alignment with platform 11a. The rockers tilt in either direction. This allows the platforms to reciprocate in loading and unloading each other. Parking devices like the device P may be made with two pairs of parking platforms, also with one pair of platforms. Such devices would not be as economical as the three tier device because the small capacity type devices would use the same ground area, the same sized powered hoist, the same sized safety hydraulic cylinder and like supplementary parts as would the three tier device.

The modified parking device W shown in Figs. 6 and 7 is similar to the device P. It differs mainly in that it has a single rocker 32 on each side of the structure. The device W has links 33 that support the platforms from the rocker 32.

Fig. 8 shows a parking device Y, which has a pair of tiltable parking platforms 34 and 35 that are pivotally supported by the rocker beam 36. The retainers 37 engage the column 15. Hydraulic cylinder links 38 are pivotally engaged to the platforms 34 and 35, and to the retainers 37. The retainers 37 are also pivotally engaged to the platforms. The hydraulic cylinder links 38 can be shortened and lengthened in response to motor power or hand cranking to cause the platforms to pivot to position them horizontally or in tilted positions. The cylinders 38 are used to tilt the platforms 34 and 35. The drum 26 and the cable 25 are used to tilt the rocker beam 36, to raise and lower the platforms. A non-powered cylinder 27 is a safety means that can stop the tilting action of the rocker beam 36 if the drum 26 and the cable 25 fail. When the cylinders 38 are shortened or lengthened, the retainers 37 are forced to slide vertically against the column 15. Fragmentary phantom dot-dash outlines 34a and 35a indicate some horizontal positions for the platforms 34 and 35. Either or both platforms may be tilted to allow autos to be ramped up and down the platforms.

Modified parking devices with two and three pairs of tiltable platforms may be made similar to the device Y. The tiers of platforms would be arranged similar to the arrangement shown in Fig. 1.

Thus I have provided a safe, efficient and economical parking device which allows storing, shipping and parking of a large number of vehicles above a small surface.

While I have illustrated and described several specific embodiments of my invention, it will be understood that these are by way of illustration only, and that various changes and modifications may be made within the contemplation of my invention and within the scope of the following claim.

I claim:

A vehicle parking device comprising a vertical support column, a rocker having its central portion pivotally mounted on said column, a horizontally extending platform pivotally mounted on each end portion of the rocker at substantially the central portion of each platform, each platform being sufficiently long so as to support a vehicle thereon and supported sufficiently high on said column so as to provide space for storing a vehicle underneath each platform, the inward ends of said platforms being sufficiently adjacent each other to permit a vehicle to be wheeled from one platform to the other, power amplifying means for pivotally moving said rocker about said column, and means for maintaining said platforms in the horizontal position in the same horizontal plane, and means including a loose pivotal connection on said rocker for maintaining the inward ends of said platforms at a constant but very small horizontal distance from said column so as to be in substantially contacting relationship with the center line of said column throughout the entire pivotal movement of said rocker about said column, whereby the inward ends of said platforms are maintained in substantially the same vertical plane to enable wheeling of a vehicle from one platform to another when in the same horizontal plane so as to facilitate loading or unloading of a vehicle.

References Cited in the file of this patent

UNITED STATES PATENTS

| | | |
|---|---|---|
| 753,197 | Gilman | Feb. 23, 1904 |
| 905,282 | Bragg | Dec. 1, 1908 |
| 1,619,360 | Miller | Mar. 1, 1927 |
| 2,670,860 | Cogings | Mar. 2, 1954 |
| 2,733,825 | Evans | Feb. 7, 1956 |
| 2,815,872 | Graham | Dec. 10, 1957 |